Nov. 6, 1934.  I. O. PEDERSEN  1,979,571
PROCESS OF DRAWING BELL AND SPIGOT TYPE PIPE
Filed Aug. 5, 1932  2 Sheets-Sheet 1
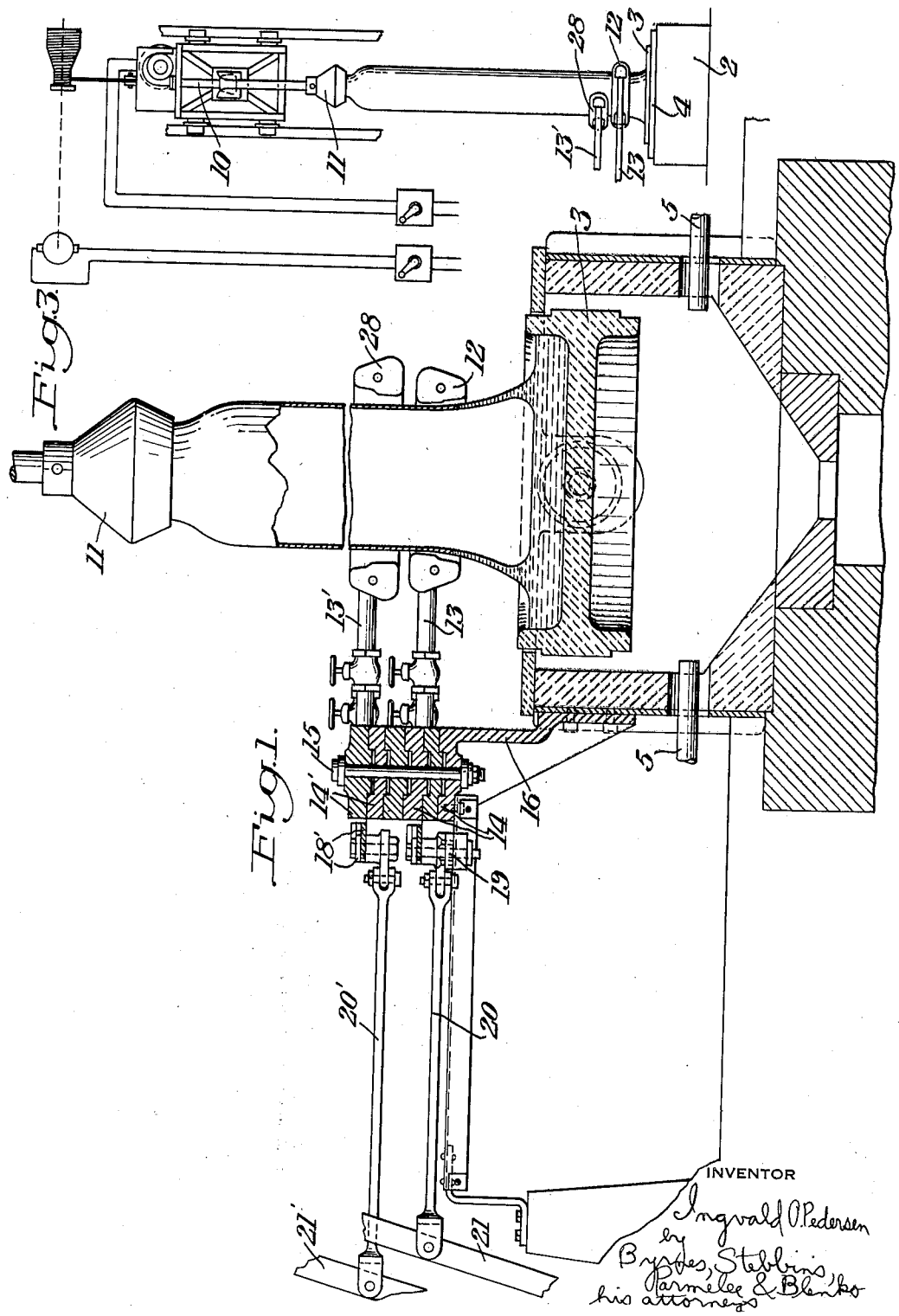

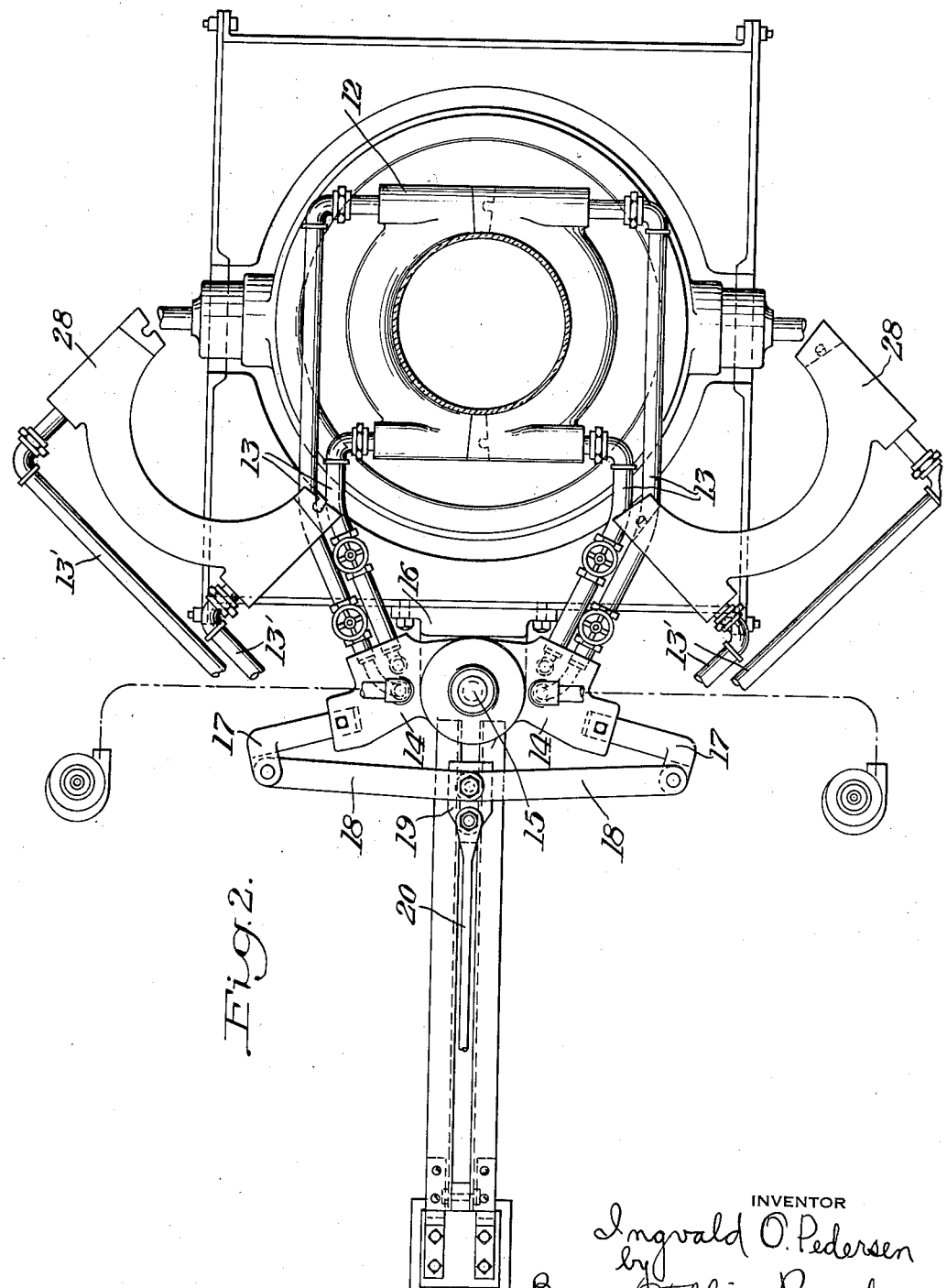

Patented Nov. 6, 1934

1,979,571

UNITED STATES PATENT OFFICE 1,979,571

PROCESS OF DRAWING BELL AND SPIGOT-TYPE PIPE

Ingvald O. Pedersen, Pittsburgh, Pa., assignor to C. P. Byrnes, Sewickley, Pa., as trustee Application August 5, 1932, Serial No. 627,580

6 Claims. (Cl. 49—17.1)

My invention relates to the making of hollow glass articles, such as glass pipe, the article being of non-uniform diameter. More particularly, my invention relates to the making of hollow glass articles having bell mouths suitable for use for conduits.

In accordance with the principles of my invention, I draw the hollow glass article upwardly from a bath of molten or viscous glass, and before the glass is set, I deflect the walls of the article inwardly by means of shaping or sizing dies. The forming of glass cylinders of uniform diameter by means of such a die is set forth in detail in my co-pending application Serial No. 366,787, filed May 29, 1929. My present invention is a modification of the method and apparatus disclosed in said co-pending application, the purpose of such modification being to form cylinders of non-uniform diameter. More particularly, it is possible by means of the present invention to draw glass pipe of the bell and spigot-type.

As set forth in my co-pending application above identified, it is of importance that the die employed during the drawing of the cylinder be above the temperature at which checking or cracking of the hollow article being drawn would occur. On the other hand, it is of importance that the temperature of the die shall not exceed that at which glass will stick to the die, at least in spots or portions so as to disfigure the article.

In accordance with the present invention, the application of such die to the walls of the article is interrupted for the formation of a bulge. In order to determine the diameter of such bulge, I employ a supplemental die or ring having an opening of larger diameter than the first mentioned die. As the next succeeding portion of the article is drawn, the diameter thereof is enlarged over the diameter of the preceding portion of the article. I may then return to the application of the first mentioned die, so as to continue the drawing of a hollow article of the same diameter as the portion first drawn. By thus alternating in the application of a die of one inner diameter, and the application of a die of another inner diameter to the walls of the article being drawn, I produce an article having, first, a portion of one diameter succeeded by a portion of another diameter, and then a portion of diameters such as the first mentioned portions. When the drawing has been completed, the article may be treated in the usual manner; for instance, it may be severed at the bulges, each bulge forming two bell ends of pipe. Annealing of the article is carried out in the usual manner. Thus, after the drawn article has been severed into sections, the sections may be passed through an annealing lehr. In the operations of drawing above described, I prefer to employ a plurality of dies. These dies may be superposed one above the other; and, at least the lower die should be cooled in the manner described in detail in my above identified co-pending application. Both dies are made in two sections so that the operator may swing the sections to inoperative position.

I will now describe one manner of carrying out my invention by reference to the accompanying drawings in which Fig. 1 is a front elevation of a glass drawing machine embodying the invention, Fig. 2 is a vertical central section showing a pot and kiln of glass drawing apparatus embodying the invention; and Fig. 3 is a top plan view of the kiln showing the mounting of the shaping die.

Referring first to Figs. 1 and 2, there is shown a kiln 2 having a double reversible pot 3 of the well known Thornburg-type therein. The usual top stones 4 and burners 5 are provided. The mechanism for elevating the bait 11 and for supplying air thereto through a conduit 10 is set forth in sufficient detail in my co-pending application above identified, so that further description is not necessary herein.

A shaping die is indicated at 12. It is made in two halves, each a hollow casting made of a heat resisting alloy, for instance, a high chromium cast iron alloy. Each die halve is supported by pipes 13 secured in brackets 14 rotatable on a hinge pin 15. The hinge pin 15 is fastened in a bracket 16 secured to the kiln structure. The brackets 14 are each provided with extensions 17 connected by links 18 to a slide 19. The slide 19 is connected by a link 20 to an operating lever 21, whereby the die halve may be opened.

The die halves are cast hollow so that, if desired, a cooling fluid, such as air or water, may be circulated therethrough. In practice, I have found that only a very small quantity of air, if any, need be fed through the ring parts.

Above the die 12 is supported a second die or ring 28. This die may be similar to the die 12. Cooling fluid may, if desired, be circulated through the die 28, as explained in connection with the die 12. Inasmuch, however, as the die 28 is protected from the heat of the bath of molten glass by the die 12, cooling of the die 28 may generally be omitted.

The die 28 is made in two halves, as is the die 12, and is supported by elements similar to the supporting elements for the die 12, these elements being indicated by the same numerals with a prime attached. The die 28 has a central opening of larger diameter than the die 12, this increased diameter being adapted to bring about the formation of bulges in the article being drawn, as will now be explained.

In the drawing of a glass article, the hollow glass article is drawn upwardly from the bath of viscous glass in the pot 3. Before the glass is set, I apply the die 12 to the walls of the article so as to deflect the walls inwardly and maintain uniform diameter during a portion of the draw. After a predetermined length of uniform diameter has been drawn, I swing open the halves of the die 12, and swing inwardly the halves of the die 28. The tendency of the meniscus is to move outwardly. The confining action of the die 12 is discontinued by the swinging of the halves thereof to inoperative position, and, therefore, the diameter of the portion of the article now being drawn is restricted only by the die 28 which has an opening of increased diameter. A suitable length having such enlarged diameter is now drawn, after which the halves of the die 12 may be returned to operative position. This again restricts the diameter of the article to that of the first portion drawn.

It is to be understood that the invention is not to be restricted to the drawing of three successive portions of which the last portion has identically the same diameter as the first mentioned portion. Instead, the diameter of the portion succeeding the bulge may be of a different diameter from that first drawn, if a suitable die be provided for this purpose. Thus the same bulge may provide bell ends for two pipe sections having different diameters.

It is thus apparent that my invention provides a simple and effective method of making conduit sections with enlarged ends. The operation of drawing continues without interruption until a plurality of such sections have been drawn all in one piece. This one-piece article may then be severed, the separation taking place so as to split the bulge and leave a bell end on each section.

The articles produced by my method do not have thinned out walls in the bell portion, inasmuch as uniform wall thickness is maintained throughout the draw. Due to the simple and effective manner in which the bulges are formed, the cost of production is considerably lowered while the quality of the articles produced is uniform and excellent.

While I have sufficiently described certain preferred embodiments of my invention to disclose the principles thereof and a way of using the same, it is to be understood that the invention is not limited to the specific details of such disclosure, but that changes may be made in the construction of the apparatus employed, or in the details and/or sequence of the steps of the process within the contemplation of the invention and under the scope of the following claims.

I claim:

1. In the drawing of hollow glass articles from a glass bath, the steps consisting of drawing a hollow article from the bath under internal gaseous pressure, deflecting its walls inwardly by die contact, withdrawing the die contact and permitting the hollow article to be enlarged by the internal pressure while continuing the draw, and then again deflecting the walls inwardly by die contact while continuing the draw.

2. In the drawing of hollow glass articles from a glass bath, the steps consisting of drawing a hollow article from the bath under internal gaseous pressure, deflecting its walls inwardly by die pressure, removing the die pressure permitting the article to enlarge, and then continuing the drawing of the hollow article through another die and deflecting its walls inwardly thereby.

3. In the drawing of hollow glass articles from a glass bath, the steps consisting in drawing a hollow glass article upwardly from the glass bath under internal gaseous pressure, deflecting its walls inwardly by die pressure, relieving the die pressure to form a larger portion, continuing the draw, and again applying die pressure to the enlarged article.

4. In the drawing of hollow glass articles from a glass bath, the steps consisting in drawing a hollow article upwardly from the glass bath under internal gaseous pressure, deflecting its walls inwardly by die pressure, then relieving the die pressure and allowing the article to enlarge under the internal pressure, continuing the draw, and reducing the size of the article by again applying die pressure.

5. In the drawing of hollow glass articles from a glass bath, the steps consisting of drawing a hollow article from the bath under internal gaseous pressure, deflecting its walls inwardly by die contact, withdrawing the die contact and permitting the hollow article to be enlarged by the internal pressure while continuing the draw, then again deflecting the walls inwardly by die contact while continuing the draw, and maintaining the die above a checking temperature and below a sticking temperature during its contact with the hollow article.

6. Apparatus for drawing glass articles, comprising a container for a bath of molten glass, means for drawing a hollow glass article therefrom, connections for supplying internal gaseous pressure to the hollow article being drawn, and a plurality of separately acting dies, said dies being arranged to alternately engage the hollow article with sliding contact during the drawing thereof, the shaping surfaces of the dies having different internal areas.

INGVALD O. PEDERSEN.